United States Patent [19]

Tanimoto

[11] 4,231,098
[45] Oct. 28, 1980

[54] CASING OF ELECTRONIC CALCULATORS

[75] Inventor: Akira Tanimoto, Kashihara, Japan

[73] Assignee: Sharp Kabushiki Kaisha, Osaka, Japan

[21] Appl. No.: 930,679

[22] Filed: Aug. 3, 1978

Related U.S. Application Data

[63] Continuation of Ser. No. 611,678, Sep. 9, 1975, abandoned.

[30] Foreign Application Priority Data

Sep. 9, 1974 [JP] Japan .................................. 49-104254
Dec. 30, 1974 [JP] Japan ..................................... 50-1630
Apr. 23, 1975 [JP] Japan .............................. 50-56086[U]

[51] Int. Cl.² ............................................. H05K 7/02
[52] U.S. Cl. .................................. 364/708; 200/5 A; 361/399; 364/712
[58] Field of Search ............... 364/708, 712, 490, 491; 29/622–628; 350/160 LC; 235/145; 200/5 R, 5 A, 5 E; 361/397–403

[56] References Cited

U.S. PATENT DOCUMENTS

| | | | |
|---|---|---|---|
| 3,693,775 | 9/1972 | Brooks et al. | 200/5 |
| 3,696,411 | 10/1972 | Kilby et al. | 200/5 A |
| 3,711,626 | 1/1973 | Kilby et al. | 174/68.5 |
| 3,823,309 | 7/1974 | Caruso | 200/5 A |
| 3,839,785 | 10/1974 | Boulanger | 29/622 |
| 3,846,791 | 11/1974 | Foster | 361/400 |
| 3,862,382 | 1/1975 | Glaister et al. | 200/5 A |
| 3,879,586 | 4/1975 | Durocher et al. | 200/5 A |
| 3,902,789 | 9/1975 | Gerritsma et al. | 350/160 LC |
| 3,911,234 | 10/1975 | Kotaka | 200/5 A |
| 3,928,736 | 12/1975 | Drage | 200/5 A |
| 3,934,074 | 1/1976 | Evelove et al. | 29/627 |

Primary Examiner—Errol A. Krass
Attorney, Agent, or Firm—Birch, Stewart, Kolasch & Birch

[57] ABSTRACT

Wiring patterns and key contact patterns are directly formed on an inner surface of a casing of an electronic calculator. A printed board or a substrate can be eliminated by mounting electrode elements on the inner surface of the casing to establish electrical connection with the wiring patterns formed on the inner surface of the casing, thereby enabling the reduction of size, especially thickness, of the electronic calculator.

17 Claims, 10 Drawing Figures

CASING OF ELECTRONIC CALCULATORS

This application is a continuation, of copending application Ser. No. 611,678, filed on Sept. 9, 1975, now abandoned.

BACKGROUND AND SUMMARY OF THE INVENTION

The present invention relates to the construction of an electronic calculator and more particularly to the construction of a casing of an electronic calculator.

A substrate or a printed board is unavoidably required in the conventional electronic calculator. Key contact patterns and wiring patterns were formed on the substrate and the electronic elements such as an LSI including a computation circuit and a display unit are mounted on the substrate to establish electrical connection with the wiring patterns formed on the substrate. The substrate carrying the electronic elements thereon is disposed in and supported by a casing of the electronic calculator.

The substrate is considerably thick since it must endure pressure caused by the key depression. This results in an electronic calculator which is considerably thick even though the necessary electronic elements are all mounted on a single substrate.

Accordingly, an object of the present invention is to provide an electronic calculator of minimum thickness.

Another object of the present invention is to provide a casing of an electronic calculator suitable for minimizing the thickness of the electronic calculator.

Still another object of the present invention is to provide a key input device suitable for minimizing the thickness of an electronic calculator.

Yet another object of the present invention is to provide an electronic calculator having no substrate or printed board.

Other objects and further scope of applicability of the present invention will become apparent form the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to one embodiment of the present invention, wiring patterns and key contact patterns are formed directly on an inner surface of a casing of an electronic calculator. Electronic elements are mounted on the inner surface of the casing to establish electrical connection with the wiring patterns formed on the inner surface of the casing. The electronic calculator becomes thin since the substrate or a printed board can be eliminated.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
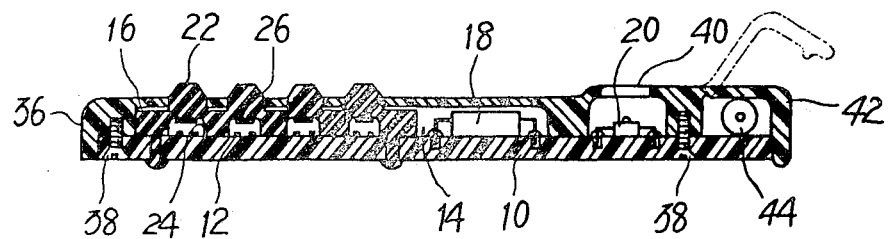
FIG. 1 is a sectional view of an embodiment of an electronic calculator of the present invention.
Figure 2:
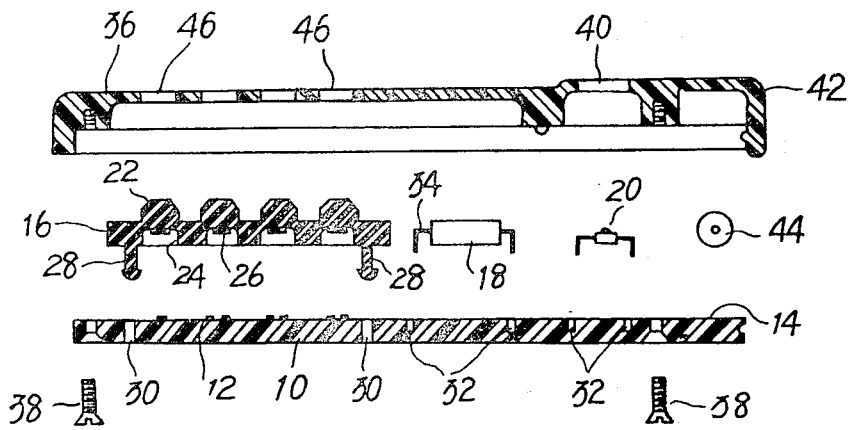
FIG. 2 is an exploded sectional view of the electronic calculator of FIG. 1.

FIG. 1 is a sectional view of an embodiment of an electronic calculator of the present invention and FIG. 2 is an exploded sectional view thereof.

A bottom cover 10 is made of an electrically insulating rigid plate such as a phenol resin plate or an epoxy resin plate and functions as a substrate. Key contact patterns 12 and wiring patterns made of conductive material such as copper film are directly formed in a desired pattern on an inner surface 14 of the bottom cover 10. A keyboard unit 16, an LSI circuit element 18, an LED display unit 20, etc., are mounted on the inner surface 14 of the bottom cover 10, the LSI circuit element 18 and the LED display unit being electrically connected with the wiring patterns formed on the inner surface 14 of the bottom cover 10 through the use of the conventional soldering technique.

The keyboard unit 16 is made of desirably shaped rubber or soft plastics and comprises keytops 22 of a desired number and recesses 24 provided at the rear surface of the keyboard unit 16 at the corresponding positions to the keytops 22 and the key contact patterns 12. Movable key contacts 26 are attached to the recesses 24 of the keyboard unit 16, the movable key contacts 26 being adapted to contact with the key contact patterns 12 when the corresponding keytops 22 are depressed for information entry. Couplers 28 are provided on the rear surface of the keyboard unit 16 for coupling the keyboard unit 16 with the bottom cover 10 through holes 30 provided through the bottom cover 10.

Electronic elements such as the LSI circuit element 18 are fixed to the bottom cover 10 with the use of the conventional soldering technique. Recesses 32 are preferably provided on the inner surface 14 of the bottom cover 10, where lead terminals 34 of the electronic elements are inserted and connected with the wiring patterns formed on the inner surface 14 of the bottom cover 10 through the use of the soldering technique.

An upper cover 36 is fixed to the bottom cover 10 through the use of screws 38. The upper cover 36 comprises a display window 40, a rotatable side wall 42 for providing a chamber for a cell 44, and holes 46 through which the keytops 22 are provided.

Figure 3:
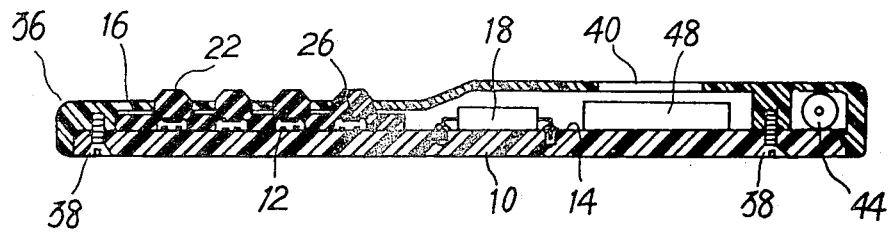
FIG. 3 is a sectional view of another embodiment of an electronic calculator of the present invention including a liquid crystal display unit.

Referring now to FIG. 3, there is illustrated another embodiment of the electronic calculator of the present invention, wherein like elements corresponding to those of FIG. 1 are indicated by like numerals.

Figure 4:
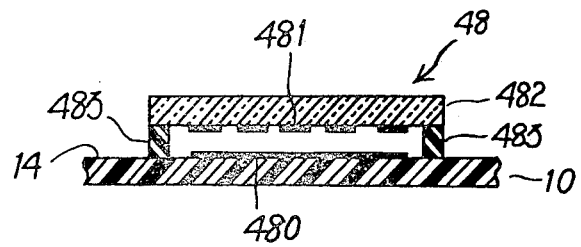
FIG. 4 is a sectional view of the liquid crystal display unit included within the electronic calculator of FIG. 3.

A liquid crystal display unit 48 is employed for displaying numeral information. FIG. 4 shows detailed construction of the liquid crystal display unit 48. A reflection electrode 480 made of aluminum is provided on the inner surface 14 of the bottom cover 10. A glass substrate 482 is disposed above the reflection electrode 480 via a spacer 483, the glass substrate 482 having transparent segment electrodes 481 on its inner surface. A liquid crystal composition is filled between the glass substate 482 and the bottom cover 10.

Figure 5:
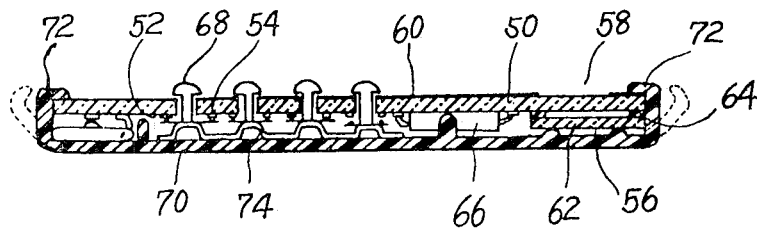
FIG. 5 is a sectional view of still another embodiment of an electronic calculator of the present invention including a liquid crystal display unit.

FIG. 5 shows still another embodiment of the present invention, wherein a liquid crystal display unit is employed for numeral display purpose.

A hard glass substrate 50 carries on its inner surface 52 wiring patterns, key contact patterns 54, and transparent segment electrodes for liquid crystal display unit 56, and functions as an upper cover of the electronic calculator. The glass substrate 50 is transparent or translucent at a display window 58, whereas other portions can be coated with colored film 60.

Another glass plate 62 coated with reflection electrodes is provided in such a manner to face the transparent segment electrodes via a spacer 64, thereby establishing the liquid crystal display unit 56. An LSI element 66 is mounted on the inner surface 52 of the glass substrate 50 in such a manner to contact with the wiring patterns formed on the inner surface 52 of the glass substrate 50. Key switches 68 are associated with the key contact patterns 54 formed on the inner surface 52 of the glass substrate 50.

A bottom cover 70 is removably fixed to the glass substrate 50 via a coupler 72 provided on a side wall of the bottom cover 70. Elastic material 74 such as rubber is mounted on the inner surface of the bottom cover 70 to face the key switches 68 in such a manner as to force the key switches 68 upward. Therefore, the key switches 68 are usually in their closed positions, and in their open positions upon manual depression of the key switches 68.

Figure 6:
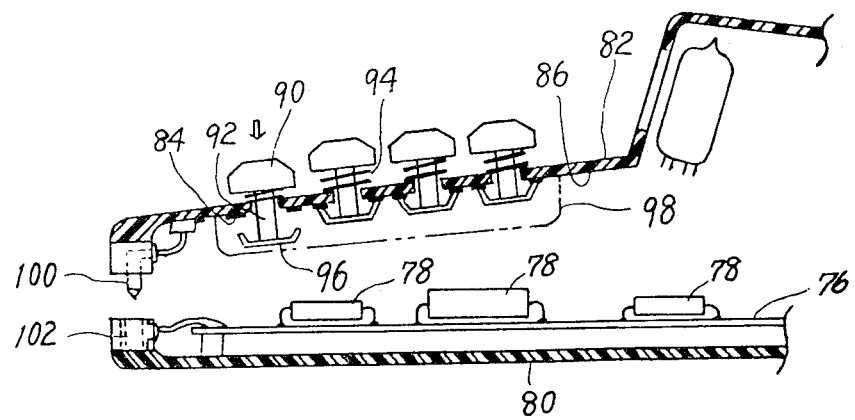
FIG. 6 is a sectional view of a key input unit of yet another embodiment of an electronic calculator of the present invention.

Referring now to FIG. 6, there is illustrated a key input unit suitable for the present invention. Although a printed board 76 is provided to support electronic elements 78, the printed board 76 can be eliminated by directly mounting the electronic elements 78 on a bottom cover 80 on which wiring patterns are formed as described above.

Figure 7:
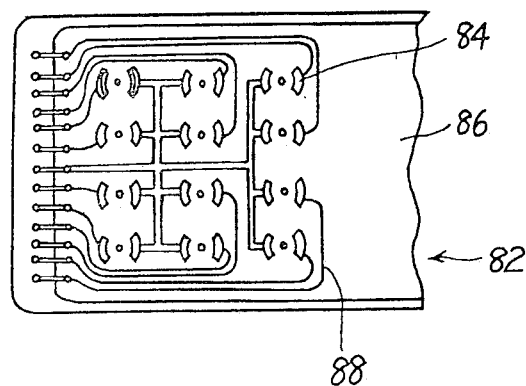
FIG. 7 is a plan view of key contact patterns suitable for the key input unit of FIG. 6.

An upper cover 82 made of plastics is provided with key contact patterns 84 on its inner surface 86. The key contact patterns 84 and key input wiring 88 are directly formed on the inner surface 86 of the upper cover 82 in a configuration shown in FIG. 7 through the use of the conventional thick layer printing technique or non-electrolytic plating technique. The respective key contact patterns 84 are associated with key switches.

The key switch comprises a key top 90, a shaft 92, a spring 94 and a movable key contact 96. The movable key contact 96 is usually forced upward by the spring 94 to contact with the key contact pattern 84 formed on the inner surface 86 of the upper cover 82. The movable key contact 96 is spaced away from the key contact pattern 84 upon manual depression of the key switch.

Figure 8:
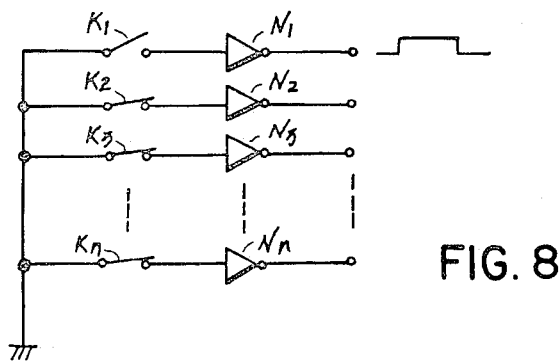
FIG. 8 is a schematic circuit diagram of a key input system suitable for the key input unit of FIG. 6.

A typical circuit construction suitable for detacting the key depression is shown in FIG. 8. The respective key switches $K_1$, $K_2$,-$K_n$ are connected with the conventional key input system via inverters $N_1$, $N_2$,-$N_n$ is order to detect the key depression and generate a key input signal.

A dust-proof case 98 is preferably provided to cover the key switches in the casing. Electrical connection between the key input wiring 88 on the upper cover 82 and wiring patterns formed on the printed board 76 is achieved by provision of a pair of connectors 100 and 102 provided on the side wall of the upper cover 82 and the bottom cover 80, the connector 102 on the bottom cover 80 being connected with the wiring patterns on the printed board 76.

Figure 9:
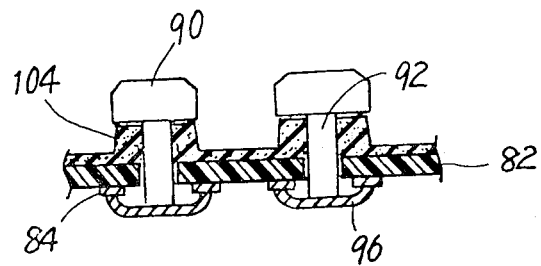
FIG. 9 is a sectional view of an essential part of another embodiment of a key input unit of an electronic calculator of the present invention.

Referring now to FIG. 9, there is illustrated another embodiment of key switches, wherein like elements corresponding to those of FIG. 6 are indicated by like numerals. An elastic member 104 made of, for example, sponge is interposed between the upper cover 82 and the key top 90 to urge the movable key contact 96 upward.

Figure 10:
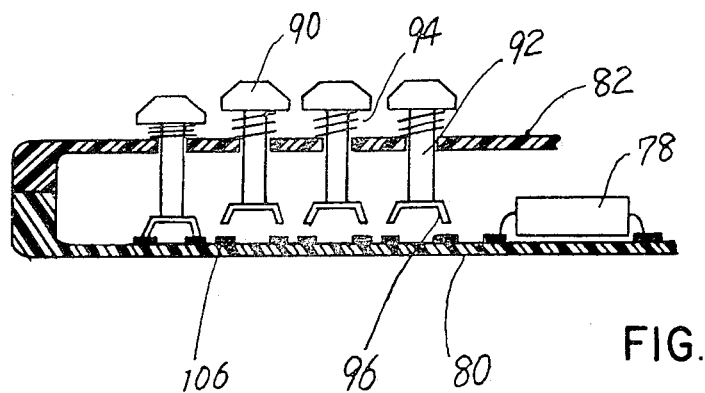
FIG. 10 is a sectional view of still another embodiment of a key input unit of an electronic calculator of the present invention.

FIG. 10 shows still another embodiment of key switches. Key contact patterns 106 are directly formed on the inner surface of the bottom cover 80 on which the electronic elements 78 are mounted to establish electrical connection with the wiring patterns directly formed on the inner surface of the bottom cover 80. The movable key contact 96 is usually spaced away from the key contact pattern 106 by the spring 94. The movable key contact 96 comes into contact with the key contact pattern 106 upon manual depression of the key switch.

The invention being thus described, it will be ovbious that the same may be varied in many ways. Such variations are not to be regarded as a departure from the spirit and scope of the invention, and all such modifications are intended to be included within the scope of the following claims.

What is claimed is:

1. An electronic calculator comprising:
   a. an upper cover;
   b. wiring patterns directly formed on an inner surface of the upper cover;
   c. a display unit mounted on the inner surface of the upper cover and electrically connected to the wiring patterns;
   d. a computation circuit unit mounted on the inner surface of the upper cover and electrically connected to the wiring patterns;
   e. key contact patterns formed directly on the inner surface of the upper cover and electrically connected to the wiring patterns;
   f. key switches electrically associated with the key contact patterns; and
   g. a bottom and side cover fixed to the upper cover.

2. The electronic calculator of claim 1, wherein the upper cover is made of glass and the display unit is made of a liquid crystal display unit of which segment electrodes are formed directly on the inner surface of the glass cover.

3. An electronic calculator comprising an upper cover and a bottom cover, key contact patterns and wiring patterns formed directly on the inner surface of the bottom cover, a computation circuit unit and a display unit mounted on the inner surface of the bottom cover, the computation circuit unit and the display unit being electrically connected to said key contact patterns by said wiring patterns, and a keyboard unit containing a plurality of key contacts mounted on the bottom cover and extending over the key contact patterns between the upper cover and the bottom cover, said key contacts being adapted to contact corresponding key contact patterns when the key contacts are depressed for information entry, said keyboard unit further comprising a plurality of apertures for receiving said key contacts and couplers extending from the bottom surface of the keyboard unit, said bottom cover being provided with through holes which correspond in position to that of said couplers, said couplers extending through said through holes for coupling the keyboard unit with the bottom cover.

4. The electronic calculator of claim 3, wherein the circuit element is an LSI circuit element and the display unit is an LED display unit.

5. The electronic calculator of claim 3, wherein the bottom cover is made of an electrically insulating rigid plate which functions as a substrate.

6. The electronic calculator of claim 5, wherein the rigid plate is selected from the group consisting of a phenol resin plate and an epoxy resin plate.

7. The electronic calculator of claim 3, wherein the key contact patterns and wiring pattern are made of a conductive material.

8. The electronic calculator of claim 3, wherein the upper cover is provided with a plurality of holes and keytops which are attached to the key contacts and adapted to extend through said holes.

9. The electronic calculator of claim 3, wherein the upper cover is provided with a display window and a rotatable sidewall, said sidewall and bottom cover defining a chamber for housing a power cell.

10. The electronic calculator of claim 3, wherein a liquid crystal display unit for displaying numeral information is disposed between said upper and bottom covers, and below said display window.

11. The electronic calculator of claim 10, wherein the liquid crystal display unit comprises a reflection electrode provided on the inner surface of the bottom cover, a glass substrate disposed above and spaced apart from the reflection electrode, said glass substrate being provided on its inner surface with a plurality of transparent segment electrodes and a liquid crystal composition disposed between the glass substrate and the bottom cover.

12. The electronic calculator of claim 3 wherein the couplers are an integral portion of the keyboard unit and when coupled with the bottom cover becomes integral therewith.

13. An electronic calculator comprising an upper cover and a bottom cover, key contact patterns and wiring patterns formed directly on the inner surface of the upper cover, a plurality of key switches slidably extending through said upper cover from the outside to the inside thereof, said key switches provided with key contact means, said key contact means being biased for contact with said key contact patterns, wiring patterns formed directly on the bottom cover, electronic elements mounted on the bottom cover and electrically connected to said wiring patterns and means for providing an electrical connection between the wiring patterns on the upper cover and the wiring patterns on the bottom cover.

14. The electronic calculator of claim 13, wherein the key switches are biased for contact with said key contact patterns by spring means.

15. The electronic calculator of claim 13, wherein the key switches are biased for contact with said key contact patterns by an elastic member.

16. An electronic calculator comprising an upper cover and a bottom cover, key contact patterns and wiring patterns formed directly on the inner surface of the bottom cover, a computation circuit unit and a display unit mounted on the inner surface of the bottom cover, the computation circuit unit and the display unit being electrically connected to said key contact patterns by said wiring patterns, a plurality of key switches mounted on the upper cover and slidably extending through the upper cover from the outside to the inside thereof and provided with key contact means for contacting corresponding key contact patterns when the key switches are depressed for information entry and bias means for causing said key contact means being brought into contact with said key contact patterns by the manual depression of the key switches.

17. The electronic calculator of claim 16, wherein the bias means is a spring means.

* * * * *